United States Patent
Bae et al.

(10) Patent No.: US 9,543,623 B2
(45) Date of Patent: Jan. 10, 2017

(54) BATTERY CONDITION INDICATOR

(71) Applicant: DURACELL U.S. OPERATIONS, INC., Wilmington, DE (US)

(72) Inventors: In Tae Bae, New Milford, CT (US); Michael Pozin, Brookfield, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 0 days.

(21) Appl. No.: 14/102,542

(22) Filed: Dec. 11, 2013

(65) Prior Publication Data

US 2015/0162649 A1    Jun. 11, 2015

(51) Int. Cl.
*H01M 10/48* (2006.01)

(52) U.S. Cl.
CPC ......... *H01M 10/484* (2013.01); *H01M 10/488* (2013.01)

(58) Field of Classification Search
CPC .......................... H01M 10/484; H01M 10/488
See application file for complete search history.

(56) References Cited

U.S. PATENT DOCUMENTS

| | | | |
|---|---|---|---|
| 5,250,905 A | 10/1993 | Kuo et al. | |
| 5,339,024 A | 8/1994 | Kuo et al. | |
| 5,355,089 A | 10/1994 | Treger | |
| 5,389,458 A | 2/1995 | Weiss et al. | |
| 5,418,086 A | 5/1995 | Bailey | |
| 5,458,992 A | 10/1995 | Bailey | |
| 5,491,038 A | 2/1996 | DePalma et al. | |
| 5,494,496 A | 2/1996 | Huhndorff et al. | |
| 5,525,439 A | 6/1996 | Huhndorff et al. | |
| 5,543,246 A | 8/1996 | Treger | |
| 5,596,278 A | 1/1997 | Lin | |
| 5,627,472 A | 5/1997 | Ofer et al. | |
| 5,737,114 A | 4/1998 | Bailey | |
| 5,849,046 A | 12/1998 | Bailey | |
| 5,925,479 A | 7/1999 | Wei et al. | |
| 6,127,062 A | 10/2000 | Sargeant et al. | |
| 6,143,439 A | 11/2000 | Yoppolo et al. | |
| 6,587,250 B2 | 7/2003 | Arngarth et al. | |
| 7,489,431 B2 | 2/2009 | Malmström et al. | |
| 2009/0008031 A1 | 1/2009 | Gould et al. | |
| 2010/0081049 A1 | 4/2010 | Holl et al. | |
| 2011/0104535 A1 | 5/2011 | Arsenault et al. | |
| 2012/0081774 A1 | 4/2012 | De Paiva Martins et al. | |

OTHER PUBLICATIONS

PCT International Search Report with Written Opinion in corresponding Int'l appln. PCT/US2014/067060 dated Feb. 10, 2015.

*Primary Examiner* — Jane Rhee
(74) *Attorney, Agent, or Firm* — Marshall, Gerstien & Borun LLP (57) ABSTRACT

The invention is directed towards a battery condition indicator. The battery condition indicator includes at least one indicator electrode, a counter electrode for the at least one indicator electrode, and a separator that is combined with an electrolyte. The at least one indicator electrode is in electrical connection with a first terminal of a battery. The at least one indicator electrode includes at least one redox material. The counter electrode is a second terminal of the battery. The separator that is combined with electrolyte is positioned between the at least one indicator electrode and the counter electrode.

18 Claims, 4 Drawing Sheets

BATTERY CONDITION INDICATOR

FIELD OF THE INVENTION

This invention relates generally to electrochemical cells, or batteries, and, more specifically, to a combination of a battery and a battery condition indicator that displays a condition of the battery.

BACKGROUND OF THE INVENTION

Electrochemical cells, or batteries, are commonly used as electrical energy sources. A battery contains a negative electrode, typically called the anode, and a positive electrode, typically called the cathode. The anode contains an active material that can be oxidized. The cathode contains an active material that can be reduced. The anode active material is capable of reducing the cathode active material. A separator is disposed between the anode and the cathode. These components are contained within a can, or housing, that is typically made from metal.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the anode and cathode to maintain charge balance throughout the battery during discharge.

Batteries that include an indicator for visually displaying the condition, such as the state of charge, of the battery are known. Known indicators include, for example, electrochromic materials in electrical contact with the battery and thermochromic materials in thermal contact with a resistive element that is adapted to be connected across the battery. Electrochromic materials are materials that change color or transparency when subjected to electrical charge. Thermochromic materials are materials that change color or transparency when subjected to temperature change.

The known indicators typically require a consumer to physically interact with the indicator in order for the battery-related information to be displayed. A thermochromic indicator, for example, may include a resistor that is connected in series with the battery to form a circuit during voltage measurement. A switch must be present within the circuit to break electrical connection from the indicator to the battery when the indicator is not in use. The battery will prematurely discharge if the thermochromic indicator is in permanent electrical contact with the battery since a leakage current will be flow from the battery through the thermochromic indicator. Known electrochromic indicators will also suffer from issues associated with battery leakage current, similar to that of thermochromic indicators, without the presence of a switch within the indicator circuit. In addition, consumers with, or without, dexterity issues may find it difficult to operate the switch within the indicator. The switch generally includes at least one, and more often two, press-points that must be engaged to close the circuit. The press-points are typically very small; may be hard to see; and may be difficult to press. The known indicators are also sensitive to the amount of force with which the press-point(s) are closed. The condition of the battery that is displayed, if a condition is displayed at all, may be affected by the sensitivity and thus the accuracy of the indicator may be adversely affected.

Known indicators may also be permanently connected to the battery so that consumer interaction is not needed to activate the battery condition indicator. The known indicators of this type, however, typically include a distinct indicator electrode and a distinct counter electrode within the construction of the indicator. The inclusion of two electrodes within the indicator occupies space and increases the complexity of manufacturing the indicator. In addition, the additional components increases the overall cost of manufacturing the indicator.

The present invention overcomes the problems associated with the known indicators by employing a battery tester comprising an electrochemically generated display that is in permanent electrical connection with the battery. Consumer interaction to display the condition or state of charge of the battery is not needed. The accuracy of the indicator is not adversely affected by the operation of a switch since no consumer interaction is needed to activate the indicator. The affects of parasitic discharge are minimized within the battery condition indicator of the present invention and the useful capacity of the battery is minimally reduced over an extended period of storage. The indicator of the present invention is also simplistic in design and is less costly with respect to known indicators to manufacture.

SUMMARY OF THE INVENTION

In one embodiment, invention is directed towards a battery condition indicator. The battery condition indicator includes at least one indicator electrode, a counter electrode for the at least one indicator electrode, and a separator that is combined with an electrolyte. The at least one indicator electrode is in electrical connection with a first terminal of a battery. The at least one indicator electrode includes at least one redox material. The counter electrode is a second terminal of the battery. The separator that is combined with electrolyte is positioned between the at least one indicator electrode and the counter electrode.

BRIEF DESCRIPTION OF THE DRAWINGS

While the specification concludes with claims particularly pointing out and distinctly claiming the subject matter, which is regarded as forming the present invention, it is believed that the invention will be better understood from the following description taken in conjunction with the accompanying drawings.

DETAILED DESCRIPTION OF THE INVENTION

Electrochemical cells, or batteries, may be primary or secondary. Primary batteries are meant to be discharged, e.g., to exhaustion, only once and then discarded. Primary batteries are described, for example, in David Linden, Handbook of Batteries (McGraw-Hill, 4th ed. 2011). Secondary batteries are intended to be recharged. Secondary batteries may be discharged and recharged many times, e.g., more than fifty times, a hundred times, or more. Secondary batteries are described, e.g., David Linden, Handbook of Batteries (McGraw-Hill, 4th ed. 2011). Accordingly, batteries may include various electrochemical couples and electrolyte combinations. Although the description and examples provided herein are generally directed towards battery condition indicators as applied to primary alkaline electrochemical cells, or batteries, it should be appreciated that the invention applies to both primary and secondary batteries of either aqueous or nonaqueous systems. Battery condition indicators as applied to both primary and secondary batteries of either aqueous or nonaqueous systems are thus within the scope of this application and the invention is not limited to any particular embodiment.

Figure 1:
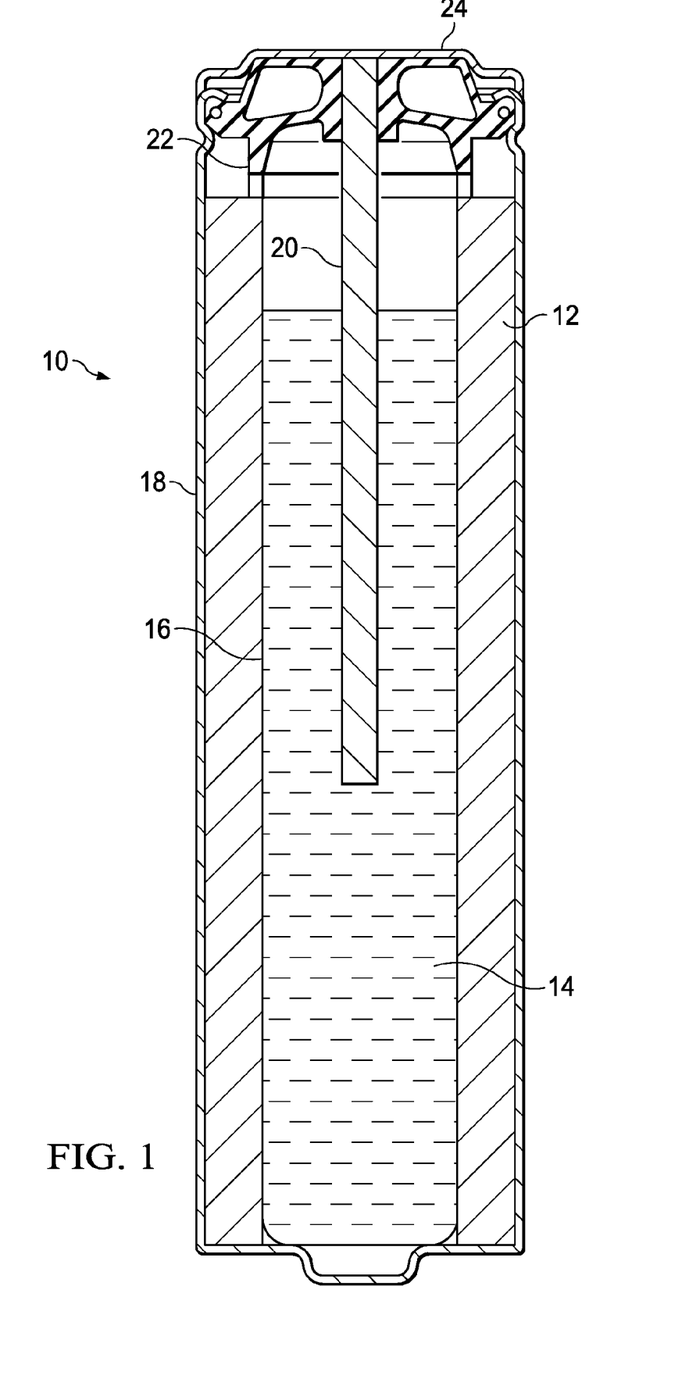
FIG. 1 is a cross-section of a primary alkaline battery.

Referring now to FIG. 1, there is shown an electrochemical cell, or battery, 10 including a cathode 12, an anode 14, a separator 16, and a housing 18. Battery 10 also includes current collector 20, seal 22, and an end cap 24. An electrolytic solution is dispersed throughout the battery 10. Battery 10 is, for example, a primary alkaline battery and can be a AA, AAA, AAAA, C, or D alkaline battery.

The housing 18 can be of any conventional type of housing commonly used in the production of batteries and can be made of any suitable material, for example cold-rolled steel or nickel-plated cold-rolled steel. The housing 18 may have a cylindrical shape—or may have any other suitable non-cylindrical shape, e.g., a prismatic shape for example, a shape comprising at least two parallel plates, such as a rectangular or square shape. The housing 18 may be, for example, deep-drawn from a sheet of the base material, such as cold-rolled steel or nickel-plated steel.

The base material for the housing 18 may be treated prior to the formation of the housing 18, such as pre-plated, with a surface coating. The surface coating may be applied to at least one surface of the base material. The surface coating may be applied to all surfaces of the base material. The surface coating may be, for example, metal oxide, metal hydroxide, metal oxyhydroxide, nickel, nickel oxide, nickel hydroxide, nickel oxyhydroxide, vanadium oxide, manganese, manganese oxide, manganese hydroxide, manganese oxyhydroxide, manganese dioxide, copper, copper oxide, copper hydroxide, iron, iron oxide, iron hydroxide, iron oxyhydroxide, cobalt, cobalt oxide, cobalt hydroxide, cobalt oxyhydroxide, chromium, chromium oxide, chromium hydroxide, carbon black, graphene, graphite, or any combination thereof.

The housing 18 may be, for example, drawn from the base material into a cylindrical shape. The housing 18 may have at least one open end. The housing 18 may have a closed end and an open end with a sidewall therebetween. The surface coating of the housing 18, if drawn from pre-plated base material, may be located, at least, on the external wall of the housing 18.

The housing 18 may be treated after the formation of the housing 18, such as post-plated, with a surface coating. The surface coating of the housing 18 may be located, at least, on the external wall of the housing 18. The surface coating of the housing 18 may cover a part or all of the external surface area of the housing 18. The surface coating may be, for example, metal oxide, metal hydroxide, metal oxyhydroxide, nickel, nickel oxide, nickel hydroxide, nickel oxyhydroxide, vanadium oxide, manganese, manganese oxide, manganese hydroxide, manganese oxyhydroxide, manganese dioxide, copper, copper oxide, copper hydroxide, iron, iron oxide, iron hydroxide, iron oxyhydroxide, cobalt, cobalt oxide, cobalt hydroxide, cobalt oxyhydroxide, chromium, chromium oxide, chromium hydroxide, carbon black, graphene, graphite, or any combination thereof.

The interior walls of the housing 18 may be treated with a material that provides a low electrical-contact resistance between the interior wall of the housing 18 and an electrode. The interior walls of the housing 18 may be plated, e.g., with nickel, cobalt, and/or painted with a carbon-loaded paint to decrease contact resistance between the internal wall of the housing and the cathode 12.

The housing 18 may function as a positive terminal or a negative terminal of the battery 10. The housing 18 may be a first terminal or a second terminal of the battery 10. As shown in FIG. 1, the housing 18 is the second terminal 120 of the battery 10. The second terminal 120 of the battery 10 in FIG. 1 is also the positive terminal of the battery 10.

Cathode 12 includes one or more electrochemically active cathode materials. The electrochemically active cathode material may include manganese oxide, manganese dioxide, electrolytic manganese dioxide (EMD), chemical manganese dioxide (CMD), high power electrolytic manganese dioxide (HP EMD), lambda manganese dioxide, gamma manganese dioxide, beta manganese dioxide, and mixtures thereof. Other electrochemically active cathode materials include, but are not limited to, silver oxide; nickel oxide; nickel oxyhydroxide; copper oxide; copper salts, such as copper iodate; bismuth oxide; high-valence nickel compound; oxygen; and mixtures thereof. The nickel oxide can include nickel hydroxide, nickel oxyhydroxide, cobalt oxyhydroxide-coated nickel oxyhydroxide, delithiated layered lithium nickel oxide, and combinations thereof. The nickel hydroxide or oxyhydroxide can include beta-nickel oxyhydroxide, gamma-nickel oxyhydroxide, and/or intergrowths of beta-nickel oxyhydroxide and/or gamma-nickel oxyhydroxide. The cobalt oxyhydroxide-coated nickel oxyhydroxide can include cobalt oxyhydroxide-coated beta-nickel oxyhydroxide, cobalt oxyhydroxide-coated gamma-nickel oxyhydroxide, and/or cobalt oxyhydroxide-coated intergrowths of beta-nickel oxyhydroxide and gamma-nickel oxyhydroxide. The nickel oxide can include a partially delithiated layered nickel oxide having the general chemical formula $Li_{1-x}H_yNiO_2$, wherein $0.1 \le x \le 0.9$ and $0.1 \le y \le 0.9$. The high-valence nickel compound may, for example, include tetravalent nickel.

The cathode 12 may also include a conductive additive, such as carbon particles, and a binder. The cathode 12 may also include other additives. The carbon particles are included in the cathode to allow the electrons to flow through the cathode. The carbon particles may be graphite, such as expanded graphite and natural graphite; graphene, single-walled nanotubes, multi-walled nanotubes, carbon fibers; carbon nanofibers; and mixtures thereof. It is preferred that the amount of carbon particles in the cathode is relatively low, e.g., less than about 7.0%, less than 3.75%, or even less than 3.5%, for example 2.0% to 3.5%. The cathode 12 will have a calculable porosity. The calculable porosity of the cathode 12 may be from about 15% to about 45% and is preferably between about 22% and about 35% for cylindrical alkaline batteries.

The cathode components, such as active cathode material(s), carbon particles, binder, and any other additives, may be combined with a liquid, such as an aqueous potassium hydroxide electrolyte, blended, and pressed into pellets for use in the manufacture of a finished battery. For optimal pellet processing, it is generally preferred that the cathode material have a moisture level in the range of about 2.5% to about 5%, more preferably about 2.8% to about 4.6%. The pellets, after being placed within a battery housing during the battery assembly process, are typically re-compacted to form a uniform cathode assembly.

Examples of binders that may be used in the cathode 12 include polyethylene, polyacrylic acid, or a fluorocarbon resin, such as PVDF or PTFE. An example of a polyethylene binder is sold under the trade name COATHYLENE HA-1681 (available from Hoechst or DuPont). Examples of other cathode additives are described in, for example, U.S. Pat. Nos. 5,698,315, 5,919,598, and 5,997,775 and 7,351,499, all hereby incorporated by reference.

The amount of electrochemically active cathode material within the cathode 12 may be referred to as the cathode loading. The loading of the cathode 12 may vary depending upon the electrochemically active cathode material used within, and the cell size of, the battery. The cathode loading for batteries including manganese dioxide electrochemically active cathode material may be, for example, from about 9.0 grams or more for a AA battery; from about 4.0 grams or more for a AAA battery; from about 2.0 grams or more for a AAAA size battery; from about 25.0 grams or more for a C size battery; and from about 54.0 grams or more for a D size battery.

Anode 14 can be formed of at least one electrochemically active anode material, a gelling agent, and minor amounts of additives, such as organic and/or inorganic gassing inhibitor. The electrochemically active anode material may include zinc.

The amount of electrochemically active anode material within the anode 14 may be referred to as the anode loading. The loading of the anode 14 may vary depending upon the electrochemically active anode material used within, and the cell size of, the battery. The anode loading for batteries including zinc electrochemically active anode material may be, for example, from about 3.3 grams or more for a AA battery; from about 1.9 grams or more for a AAA battery; from about 0.6 grams or more for a AAAA size battery; from about 9.5 grams or more for a C size battery; and from about 19.5 grams or more for a D size battery.

Examples of a gelling agent that may be used include a polyacrylic acid; a polyacrylic acid cross-linked with polyalkenyl ether of divinyl glycol, such as Carbopol; a grafted starch material; a salt of a polyacrylic acid; a carboxymethylcellulose; a salt of a carboxymethylcellulose (e.g., sodium carboxymethylcellulose); or combinations thereof. The anode may include a gassing inhibitor that may include an inorganic material, such as bismuth, tin, or indium. Alternatively, the gassing inhibitor can include an organic compound, such as a phosphate ester, an ionic surfactant, or a nonionic surfactant.

An electrolyte may be dispersed throughout the cathode 12, the anode 14, and the separator 16. The electrolyte comprises an ionically conductive component in an aqueous solution. The ionically conductive component may be a hydroxide. The hydroxide may be, for example, sodium hydroxide, potassium hydroxide, lithium hydroxide, cesium hydroxide, and mixtures thereof. The ionically conductive component may also include a salt. The salt may be, for example, zinc chloride, ammonium chloride, magnesium perchlorate, magnesium bromide, and mixtures thereof. The concentration of the ionically conductive component may be selected depending on the battery design and its desired performance. An aqueous alkaline electrolyte may include a hydroxide, as the ionically conductive component, in a solution with water. The concentration of the hydroxide within the electrolyte may be from about 0.25 to about 0.40, or from about 25% to about 40%, on a total weight basis of the electrolyte. The aqueous alkaline electrolyte may also include zinc oxide (ZnO) dissolved within it. The ZnO may serve to suppress zinc corrosion within the anode. The concentration of ZnO included within the electrolyte may be less than about 3% by weight of the electrolyte. The total weight of the aqueous alkaline electrolyte within a AA alkaline battery, for example, may be greater than about 3.0 grams. The total weight of the aqueous alkaline electrolyte within a AAA alkaline battery, for example, may be greater than about 1.0 grams.

Separator 16 comprises a material that is wettable or wetted by the electrolyte. A material is said to be wetted by a liquid when the contact angle between the liquid and the surface is less than 90° or when the liquid tends to spread spontaneously across the surface; both conditions normally coexist. Separator 16 may comprise woven or nonwoven paper or fabric. Separator 16 may include a layer of, for example, cellophane combined with a layer of non-woven material. The separator also can include an additional layer of non-woven material. Separator 16 may also be formed in situ within the battery 10. U.S. Pat. No. 6,514,637, for example, discloses such separator materials, and potentially suitable methods of their application, and is hereby incorporated by reference in its entirety. The separator material may be thin. The separator, for example, may have a dry thickness of less than 250 micrometers (microns). The separator, for example, may have a dry thickness of less than 100 microns. The separator preferably has a dry thickness from about 70 microns to about 90 microns, more preferably from about 70 microns to about 75 microns. Separator 16 has a basis weight of 40 g/m² or less. The separator preferably has a basis weight from about, 15 g/m² to about 40 g/m², and more preferably from about 20 g/m² to about 30 g/m². Separator 16 may have an air permeability value as defined in ISO 2965. The air permeability value of Separator 16 may be from about 2000 cm³/cm²·min @ 1 kPa to about 5000 cm³/cm²·min @ 1 kPa.

The current collector 20 may be made into any suitable shape for the particular battery design by any known methods within the art. The current collector 20 may have, for example, a nail-like shape. The current collector 20 may have a columnar body and a head located at one end of the columnar body. The current collector 20 may be made of metal, e.g., zinc, copper, brass, silver, or any other suitable material. The current collector 20 may be optionally plated with tin, zinc, bismuth, indium, or another suitable material presenting a low electrical-contact resistance between the current collector 20 and, for example, the anode 14 and an ability to suppress gas formation.

The seal 22 may be prepared by injection molding a polymer, such as polyamide, polypropylene, polyetherurethane, or the like; a polymer composite; and mixtures thereof into a shape with predetermined dimensions. The seal 22 may be made from, for example, Nylon 6,6; Nylon 6,10; Nylon 6,12; polypropylene; polyetherurethane; co-polymers; and composites and mixtures thereof. Exemplary injection molding methods include both the cold runner method and the hot runner method. Seal 22 may contain other known functional materials such as a plasticizer, crystalline nucleating agent, antioxidant, mold release agent, lubricant, and antistatic agent. The seal 22 may also be coated with a sealant. The seal 22 may be moisturized prior to use within the battery 10. The seal 22, for example, may have a moisture content of from about 1.0 weight percent to about 9.0 weight percent depending upon the seal material. The current collector 20 may be inserted into and through the seal 22.

The end cap 24 may be formed in any shape sufficient to close the respective battery. The end cap 24 may have, for example, a cylindrical or prismatic shape. The end cap 24 may be formed by pressing a material into the desired shape with suitable dimensions. The end cap 24 may be made from any suitable material that will conduct electrons during the discharge of the battery 10. The end cap 24 may be made from, for example, nickel-plated steel, or tin-plated steel. The end cap 24 may be electrically connected to the current collector 20. The end cap 24 may, for example, make electrical connection to the current collector 20 by being welded to the current collector 20. The end cap 24 may also include one or more apertures (not shown), such as holes, for venting any gas pressure that may build up under the end cap 24 during a gassing event within the battery 10, for example, during deep discharge or reversal of a battery within a device, that may lead to rupture of vent.

The end cap 24 may be treated after the formation of the end cap 24, such as post-plated, with a surface coating. The surface coating of the end cap 24 may cover a part or all of the external surface area of the end cap 24. The surface coating may be, for example, metal oxide, metal hydroxide, metal oxyhydroxide, nickel, nickel oxide, nickel hydroxide, nickel oxyhydroxide, vanadium oxide, manganese, manganese oxide, manganese hydroxide, manganese oxyhydroxide, manganese dioxide, copper, copper oxide, copper hydroxide, iron, iron oxide, iron hydroxide, iron oxyhydroxide, cobalt, cobalt oxide, cobalt hydroxide, cobalt oxyhydroxide, chromium, chromium oxide, chromium hydroxide, carbon black, graphene, graphite, or any combination thereof.

As shown in FIG. 1, the end cap 24 is the first terminal 110 of the battery 10. In this configuration, the first terminal 110 of the battery 10 may also be referred to as the negative terminal of the battery 10.

A battery condition indicator may include an electrochemical display that is calibrated to a state of charge of a battery. The battery condition indicator comprises at least one indicator electrode and a counter electrode for the at least one indicator electrode. The battery condition indicator is combined with a battery. The battery may have a first terminal and a second terminal. The at least one indicator electrode of the battery condition indicator may be in electrical connection with the first terminal of the battery. The at least one indicator electrode of the battery condition indicator comprises at least one redox material. The counter electrode comprises the second terminal of the battery. A separator that is combined with an electrolyte may be located between the at least one indicator electrode and the counter electrode.

The at least one indicator electrode may include a conductive substrate or a nonconductive substrate. The at least one indicator electrode may include at least one surface. The conductive substrate may be metal foil, metal film, metal grid, metal mesh, carbon foil, carbon film, carbon grid, carbon mesh, copper foil, copper film, copper grid, copper mesh, or any type of graphitic network, such as graphite film, graphite foil, graphite grid, or graphite mesh. The nonconductive substrate may be polymer film, polymer grid, and polymer mesh. Examples of suitable polymers include polyester, polypropylene, polyacrylic, polyethylene terephtalate, polyvinyl, polyvinylchloride, polyeurethane, polycarbonate, polyimide, and polyether. A conductive material may be coated on the at least one surface of the nonconductive substrate. The conductive material may be any electrically conductive metal, carbon, or polymer, such as graphite, graphene, copper, zinc; tin, and indium.

The at least one indicator electrode may include at least one electrochemically active material, the electrochemically active material referred to herein as a redox material. The at least one redox material may include zinc, tin, indium, chromium, antimony, bismuth, copper, brass, bronze, copper oxide, copper hydroxide, chromium oxide, nickel oxide, nickel oxyhydroxide, any alloy thereof, or any combination thereof. The at least one redox material may be coated onto the indicator electrode by any suitable electrochemical, chemical, or physical process, such as electrolytic plating, electroless plating, painting, or brushing.

The at least one redox material, for example zinc, may be coated onto the at least one indicator electrode via an electrolytic plating process. The at least one redox material, for example tin, may be coated onto the at least one indicator electrode via an electroless plating process. At least two redox materials may be sequentially coated onto the at least one indicator electrode. For example, a first redox material, for example tin, may be coated onto the at least one indicator electrode via an electroless plating process. A second redox material, for example zinc, may be then be sequentially coated over the tin coating on the at least one indicator electrode by an electrolytic plating process. The indicator electrode including a first and a second redox material may then be used within the battery condition indicator.

The conductive substrate may include a length. At least one substrate redox zone may be located along the length of the conductive substrate. The at least one substrate redox zone may include a first substrate redox zone; a second substrate redox zone; a third substrate redox zone; a fourth substrate redox zone; a fifth substrate redox zone; or any other number of additional substrate redox zones.

An indicator electrode with at least two substrate redox zones may be referred to as a multi-prong indicator electrode. The first substrate redox zone and any additional number of substrate redox zones may be discretely positioned, e.g., apart or detached, distinct, separate, discontinuous, or separated by a gap, to one another along the length of the conductive substrate of the multi-prong indicator electrode. The first substrate redox zone and any additional number of substrate redox zones may be adjacent, e.g., near, close, contiguous, or adjoining, to one another along the length of the conductive substrate of the multi-prong indicator electrode. The at least two substrate redox zones may be electronically connected to the same substrate or to the surface coating on the substrate.

The at least one substrate redox zone may include at least one redox material. A single redox material, for example zinc, may be plated via an electrolytic plating process onto the at least one substrate redox zone of the indicator electrode. The at least one redox zone may include a first redox material and at least one second redox material. A first redox material, for example tin, may be plated via an electroless plating process onto the first substrate redox zone of the indicator electrode. A second redox material, for example zinc, may be plated via an electrolytic plating process over the tin coating on the at least one redox zone of the indicator electrode.

The at least one redox material will undergo an electrochemical change, such as reduction or oxidation, in response to a voltage change in the battery that occurs during use, or discharge, of the battery. The electrochemical change of the redox material may be accompanied by a visual change. The visual change may include a change in color of the redox material that is visible to a consumer looking at the battery condition indicator. The color change correlates the voltage of the battery to the oxidation state of the at least one redox material. The changed color will be representative of, for example, the useful remaining capacity of the battery.

The redox material on the indicator electrode may undergo a single color change or a series of color changes during the discharge of the battery. The redox material may, for example, initially be shiny gray. The redox material may then change to a brass-like color or a bronze-like color as the battery voltage drops. The redox material may then turn a dark copper color or a yellow-tinted dark gray as the battery further discharges and the battery voltage continues to drop. The redox material may then turn a dark copper color, a light gray color, or a yellow-tinted dark gray as the battery further discharges and the battery voltage further drops.

For example, the indicator electrode indicator may pass through three distinct color changes within the battery voltage window of approximately 1.6 volts to about 0.40 volts during the discharge of the battery. The indicator electrode may exhibit a shiny gray color when the battery voltage is greater than 1.5 volts. The indicator electrode may begin to change color as the battery voltage decreases. The indicator electrode may exhibit a brass-like color when the battery voltage is between about 1.3 volts and 1.5 volts. The indicator electrode may exhibit a dark copper color when the battery voltage is between about 0.75 volts to about 1.0 volts. The color of the indicator electrode may be calibrated with the useful remaining capacity of a primary alkaline battery, such as a AA cylindrical battery. The shiny gray color may indicate to a consumer that the battery is fresh. The brass-like color may indicate to the consumer that the battery has begun discharge or use. The dark copper color may indicate to the consumer that the battery is depleted and should be replaced.

In another example, the indicator electrode may pass through two distinct color changes within the battery voltage window of approximately 1.35 volts to about 0.40 volts during the discharge of the battery. The indicator electrode may exhibit a shiny gray color when the battery voltage is greater than about 1.3 volts. The indicator electrode changes color when the battery voltage passes below about 1.3 volts. The indicator electrode exhibits a yellow-tinted dark gray color when the battery voltage is less than about 1.3 volts and greater than about 0.45 volts. The color of the indicator electrode may be calibrated with the useful remaining capacity of a primary alkaline battery, such as a AA cylindrical battery. The shiny gray color may indicate to a consumer that the battery is fresh. The yellow-tinted dark gray color may indicate to the consumer that the battery is depleted and should be replaced.

In another example, the indicator electrode indicator may pass through three distinct color changes within the battery voltage window of approximately 1.6 volts to about 0.70 volts during the discharge of the battery. The indicator electrode may exhibit a shiny gray color when the battery voltage is greater than 1.5 volts. The indicator electrode may begin to change color as the battery voltage decreases. The indicator electrode may exhibit a yellowish brass color when the battery voltage is between about 1.3 volts and 1.5 volts. The indicator electrode may exhibit a light gray color when the battery voltage is between about 1.2 volts to about 1.3 volts. The indicator electrode may exhibit a yellow-tinted dark gray color when the battery voltage is less than about 1.2 volts and greater than about 1.1 volts. The color of the indicator electrode may be calibrated with the useful remaining capacity of a primary alkaline battery, such as a AA cylindrical battery. The shiny gray color may indicate to a consumer that the battery has about 100% of its useful capacity. The yellowish brass color may indicate to the consumer that the battery has about 75% of its useful capacity. The light gray color may indicate to the consumer that the battery has about 50% of its useful capacity. The yellow-tinted dark gray bronze color may indicate to the consumer that the battery has about 25% of its useful capacity.

In another example, the first and second indicator electrodes of the multi-prong electrode each may pass through four distinct color changes within the battery voltage window of approximately 1.65 volts to about 0.7 volts during the discharge of the battery. The first and second indicator electrodes may each exhibit a shiny gray color when the battery voltage is greater than 1.5 volts. The first indicator electrode may exhibit a bronze color and the second indicator electrode may exhibit a light gray color when the battery voltage is between about 1.5 volts and 1.3 volts. The first indicator electrode may exhibit a copper color and the second indicator electrode may exhibit a bronze color when the battery voltage is between about 1.3 volts and 1.2 volts. The first indicator electrode may exhibit a copper color and the second indicator electrode may exhibit a bronze-tinted dark gray color when the battery voltage is less than about 1.2 volts. The color of the multi-prong electrode may be calibrated with the useful remaining capacity of a primary alkaline battery, such as a AA cylindrical battery. The grayish color may indicate to a consumer that the battery is fresh. The brass-like color may indicate to the consumer that the battery begun discharge or use. The copper-like color may indicate to the consumer that the battery is depleted and should be replaced.

The visual change of the redox material may also include the: (1) appearance of a deposit on the indicator electrode; (2) disappearance of the redox material from the indicator electrode; (3) morphological change of the redox material; and (4) refractive index change of the redox material. The appearance of a deposit may, for example, be the appearance of an opaque deposit or precipitation as a result of an electrochemical reaction that blocks an underlying background. The disappearance of the redox material from the indicator electrode may, for example, be the disappearance of the redox material as a result of an electrochemical reaction that reveals an underlying background. The morphological change of the redox material, for example, can be an electrochemically induced change of the redox material that is noticeable by changes in the light scattering properties of the redox material. The refractive index change of the redox material, for example, can be associated with a change in the oxidation state of the redox material such as when copper metal oxidizes to copper oxide or copper hydroxide.

The redox material may undergo a reversible reaction. The corresponding visual change of the redox material as described herein may also be reversible. For example, the appearance of a visual change of the redox material due to a momentary, or casual, reduction in battery voltage may recover to the original visual state if the battery voltage is to increase, or recover. The reversibility of the visual state of the redox material may be a beneficial attribute of the battery condition indicator if, for example, the battery is casually misplaced in a device cavity or the battery is discharge at a high current for a short period of time. These conditions may lower the battery voltage through a transition threshold voltage resulting in a visual change of the redox material, but the battery capacity may not be reduced significantly. The reversibility of the visual state of the redox material would thus eliminate falsely indicating to the consumer that the battery has lost significant capacity or is nearing the end of its useful capacity.

The at least one indicator electrode of the battery condition indicator may be in permanent electrical connection with the first terminal of the battery. The at least one indicator electrode of the battery condition indicator may be in permanent electrical connection with the second terminal of the battery. The permanent electrical connection may include an electrical lead. The electrical lead may include any electrically conductive material, such as graphite, graphene, carbon black, copper, nickel, zinc, and any combination thereof. The electrical lead may be applied between the indicator electrode and first terminal of the battery by any acceptable manner process. For example, the electrical lead, with its constituents in the form of an ink, may be applied via painting or printing. Suitable inks may include a conductive component, such as carbon (such as graphite or graphene) or copper; a carrier liquid, such as alcohol or water; and binder. Exemplary carbon inks include 112-48 Conductive Ink available from Creative Materials, Inc. (Ayer, Mass.) and Vor-Ink™ available from Vorbek Materials (Jessup, Md.). Exemplary copper ink includes DuPont CB200 available from DuPont Microcircuit Materials (Research Triangle Park, N.C.).

The electrochemical capacity of the at least one indicator electrode of the battery condition indicator is chosen to be less than the electrochemically active material that in the electrode of the terminal of the battery that the indicator electrode is connected to. The voltage change in the battery will be effectively reflected in the color change of the at least one indicator electrode of the battery condition indicator when the at least one indicator electrode is judiciously selected to have an oxidation-reduction voltage within the discharge voltage range of the battery that the battery condition indicator is combined with.

The counter electrode may be metal oxide, metal hydroxide, metal oxyhydroxide, nickel, nickel oxide, nickel hydroxide, nickel oxyhydroxide, vanadium oxide, manganese, manganese oxide, manganese hydroxide, manganese oxyhydroxide, manganese dioxide, copper, copper oxide, copper hydroxide, iron, iron oxide, iron hydroxide, iron oxyhydroxide, cobalt, cobalt oxide, cobalt hydroxide, cobalt oxyhydroxide, chromium, chromium oxide, chromium hydroxide, carbon black, graphene, graphite, oxygen, or any combination thereof. The counter electrode of the battery condition indicator may be simultaneously the second terminal of the battery. The counter electrode may include an area of the second terminal of the battery that is covered by a separator that is combined with an electrolyte.

The counter electrode of the battery condition indicator will stay in an oxidized form when the battery voltage is high. The counter electrode will be partially reduced as the battery voltage decreases, for example, during discharge. The counter electrode has an electrochemical capacity that is greater than the electrochemical capacity of the at least one indicator electrode. Thus, the exhaustion of the redox materials on the indicator electrode may occur before any exhaustion of the redox materials on the counter electrode. In this configuration, the voltage change in the battery is applied mostly to the indicator electrode rather than the counter electrode. The capacity of the counter electrode may be, for example, at least 3 times greater, from about 3 to about 1000 times greater, or from about 5 to about 100 times greater, than then capacity of the indicator electrode. The capacity of the at least one indicator electrode may be, for example, from about 50 mC/cm$^2$ to about 1000 mC/cm$^2$. The capacity of the counter electrode may be, for example, from about 150 mC/cm$^2$ to about 3,000 mC/cm$^2$, from about 250 mC/cm$^2$ to about 5,000 mC/cm$^2$, from about 5,000 mC/cm$^2$ to about 10,000 mC/cm$^2$, or from about 50,000 mC/cm$^2$ to about 1,000,000 mC/cm$^2$.

The battery condition indicator includes a separator that is combined with an electrolyte. The separator that is combined with an electrolyte is located between the at least one indicator electrode and the counter electrode. The separator that is combined with an electrolyte enables the electrochemical reaction within the battery condition indicator to occur in conjunction with changes in the battery voltage. The separator that is combined with an electrolyte may include solid polymer; fluid, for example, aqueous alkaline solutions; and any combination thereof. The solid polymer may include, for example, polyethylene oxide; polymethylmethacrylate; gel containing, for example, cellulose, polyacrylic acid, polyvinylidene fluoride, and any combination thereof; and any combination thereof. The separator that is combined with an electrolyte may include salts, such as zinc chloride, potassium hydroxide, potassium carbonate, monopotassium phosphate, and ammonium chloride. The separator that is combined with an electrolyte will have a conductivity that may be greater than about $1\times10^{-6}$ S/cm.

The battery condition indicator may be affixed to the surface of a battery. The battery condition indicator may be directly adhered to the surface of the battery. The battery condition indicator may be directly printed on the battery. The battery may include a label that is shrink-wrapped around the battery condition indicator and the battery. The battery condition indicator may be incorporated within a label that is directly affixed to the surface of the battery.

The battery condition indicator may not require consumer intervention to visually indicate to the consumer a status of the battery. The battery condition indicator may have a large internal resistance, for example, greater than about 0.5 MOhm, when the battery voltage is high, for example 1.65 V. The high internal resistance of the battery condition indicator leads to a low leakage current from the battery. As a result, a battery condition indicator that does not significantly reduce the available capacity of the battery via leakage current of the battery is produced. The current flowing from the battery through the battery condition indicator may, for example, reduce the total initial capacity of the battery by less than about 10% over a period of about ten years. For example, a AA battery combined with a battery condition indicator of the present invention may have a reduction in the total initial capacity from about 3% to about 5% over a period of ten years. A AA battery with an initial capacity of about 3 Ah, for example, may have a capacity of about 2.9 Ah after about ten years of on-shelf storage. The battery condition indicator of the present invention also results in a more simplistic design and assembly. A terminal of the battery is simultaneously utilized as the counter electrode for the battery condition indicator. As a result, the battery condition indicator requires fewer components, is easier to assemble, and is less expensive when compared with known indicators that utilize a counter electrode that is distinct from a terminal of the battery to which the battery condition indicator is attached.

Figure 2:
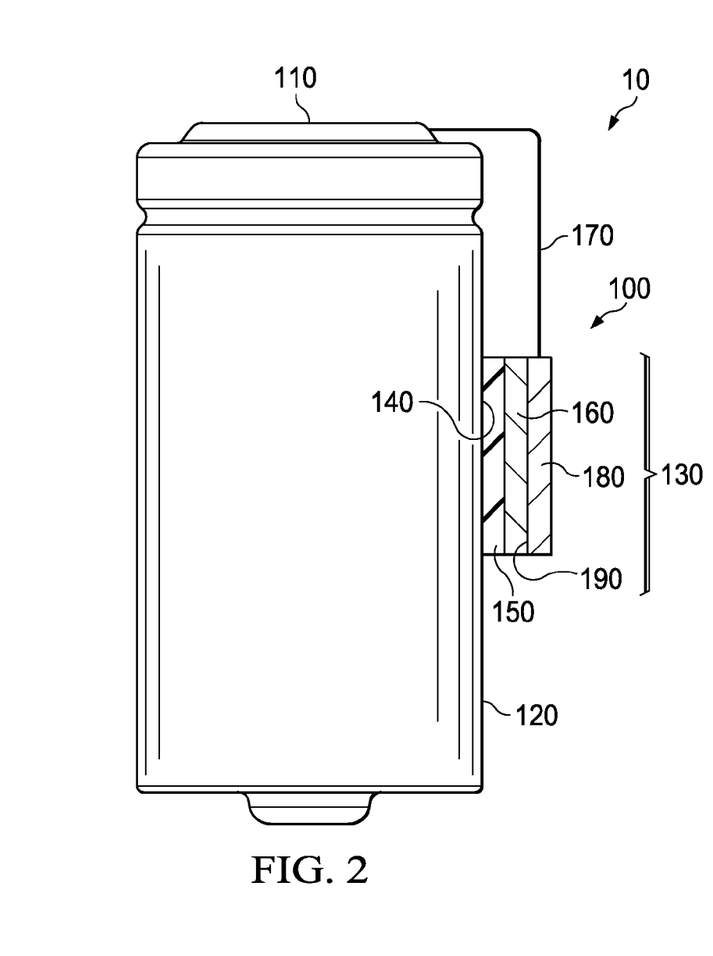
FIG. 2 is a perspective view of a combination of a battery and a battery condition indicator of the present invention.

Referring to FIG. 2, a combination of a battery condition indicator 100 and a battery 10 is shown. The battery 10 includes a first terminal 110 and a second terminal 120. The battery condition indicator 100 includes an indicator electrode 130; a counter electrode 140 for the indicator electrode 130; and a separator that is combined with an electrolyte 150. The indicator electrode 130 of the battery condition indicator 100 includes a conductive substrate 180. The conductive substrate 180 may have at least one surface 190. The conductive substrate 180 may include at least one redox material 160 on the at least one surface 190. The indicator electrode 130 may be in electrical contact with the first terminal 110 of the battery 10 via a lead 170. One end of the lead 170 may be in electrical contact with the conductive substrate 180 of the indicator electrode 130 and the other end of the lead 170 may be in electrical contact with the first terminal 110 of the battery 10. The counter electrode 140 includes an area of the second terminal 120 of the battery 10 that is covered by the separator that is combined with an electrolyte 150. The battery condition indicator 100 and the battery 10 are combined so that the consumer need not interact with the battery condition indicator 100 to initiate a display of the current state of charge of the battery 10.

Figure 3:
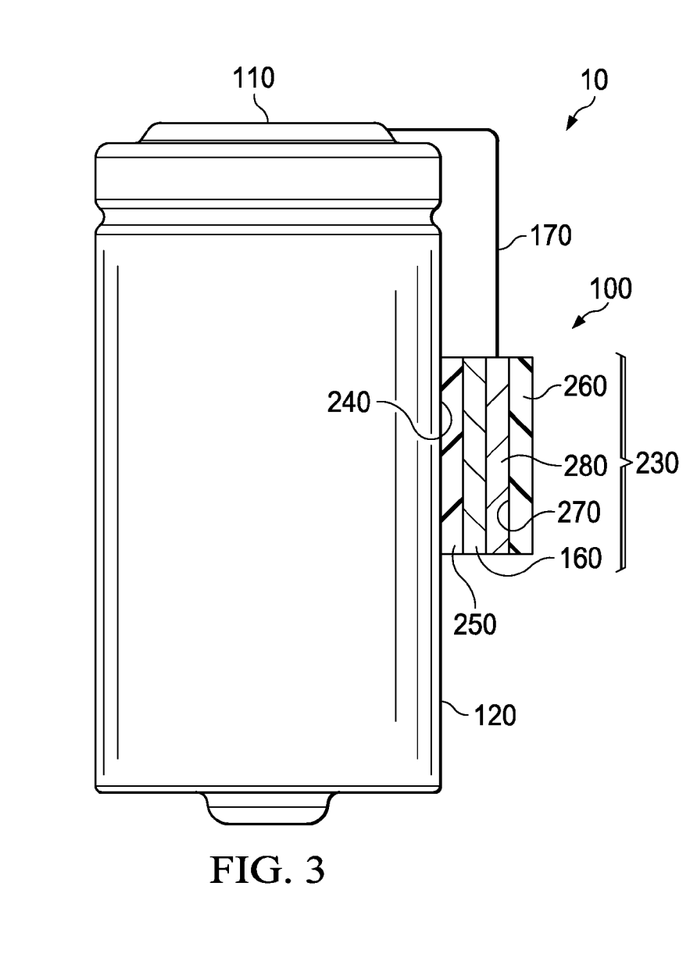
FIG. 3 is another perspective view of a combination of a battery and a battery condition indicator of the present invention.

Referring to FIG. 3, a combination of a battery condition indicator 100 and a battery 10 is shown. The battery 10 includes a first terminal 110 and a second terminal 120. The battery condition indicator 100 includes an indicator electrode 230; a counter electrode 240 for the indicator electrode 230; and a separator that is combined with an electrolyte 250. The indicator electrode 230 of the battery 10 may include a non-conductive substrate 260. The non-conductive substrate 260 may have at least one surface 270. The at least one surface 270 of the non-conductive substrate 260 may include at least one conductive coating 280. At least one redox material 160 may be coated onto the at least one conductive coating 280. The indicator electrode 230 may be in electrical contact with the first terminal 110 of the battery 10 via a lead 170. One end of the lead 170 may be in electrical contact with the conductive coating 280 of the indicator electrode 230 and the other end of the lead 170 may be in electrical contact with the first terminal 110 of the battery 10. The counter electrode 230 includes an area of the second terminal 120 of the battery 10 that is covered by the separator that is combined with an electrolyte 250. The battery condition indicator 100 and the battery 10 are combined so that the consumer need not interact with the battery condition indicator 100 to initiate a display of the current state of charge of the battery 10.

Figure 4:
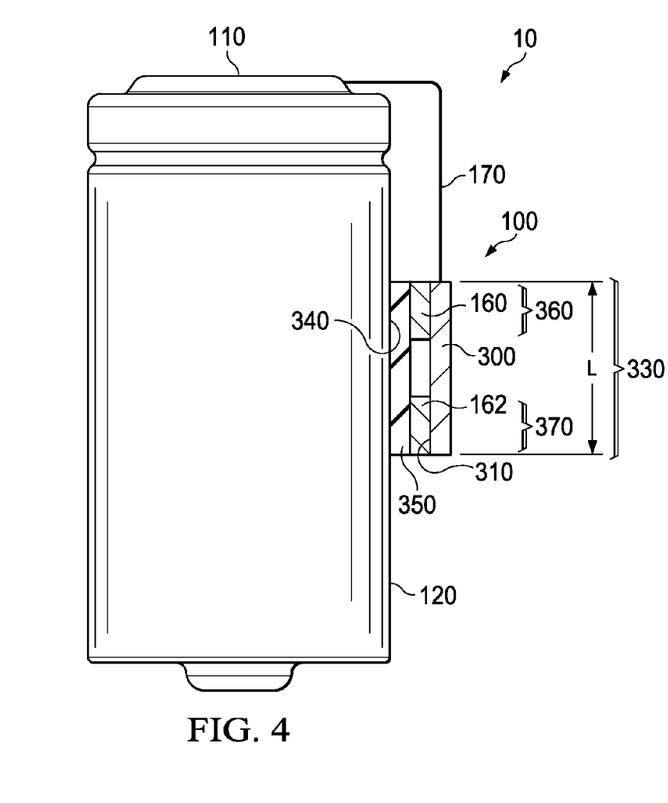
FIG. 4 is another perspective view of a combination of a battery and a battery condition indicator of the present invention.

Referring to FIG. 4, a combination of a battery condition indicator 100 and a battery 10 is shown. The battery 10 includes a first terminal 110 and a second terminal 120. The battery condition indicator 100 includes an indicator electrode 330; a counter electrode 340 for the indicator electrode 330; and a separator that is combined with an electrolyte 350. The indicator electrode 330 may include a conductive substrate 300. The conductive substrate 300 may have at least one surface 310. The conductive substrate 300 may include a length L. A first substrate redox zone 360 may be located along the length L of the conductive substrate 300 on the at least one surface 310. At least one second substrate redox zone 370 may be located along the length L of the conductive substrate 300 on the at least one surface 310. The first substrate redox zone 360 and the at least one second substrate redox zone 370 may be separated by a gap along the length L of the indicator electrode 330. The indicator electrode 330 may be in electrical contact with the first terminal 110 of the battery 10 via a lead 170. One end of the lead 170 may be in electrical contact with the conductive substrate 300 of the indicator electrode 330 and the other end of the lead 170 may be in electrical contact with the first terminal 110 of the battery 10. The counter electrode 340 includes an area of the second terminal 120 of the battery 10 that is covered by the separator that is combined with an electrolyte 350. The battery condition indicator 100 and the battery 10 are combined so that the consumer need not interact with the battery condition indicator 100 to initiate a display of the current state of charge of the battery 10.

The first substrate redox zone 360 may include at least one first redox material 160. The at least one second substrate redox zone 370 may include at least one second redox material 162. The first and second redox material 160, 162 may be the same or different material and each may be coated, or plated, onto the first substrate redox zone 360 and the at least one second redox zone 370 of the indicator electrode.

Figure 5:
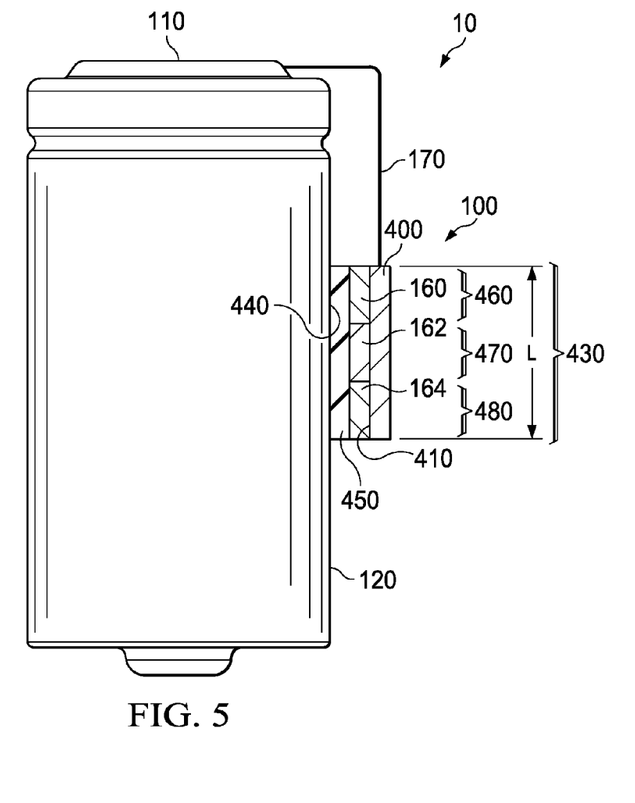
FIG. 5 is another perspective view of a combination of a battery and a battery condition indicator of the present invention.

Referring to FIG. 5, a combination of a battery condition indicator 100 and a battery 10 is shown. The battery 10 includes a first terminal 110 and a second terminal 120. The battery condition indicator 100 includes an indicator electrode 430; a counter electrode 440 for the indicator electrode 430; and a separator that is combined with an electrolyte 450. The indicator electrode 430 may include a conductive substrate 400. The conductive substrate 400 may have at least one surface 410. The conductive substrate 400 may include a length L. A first substrate redox zone 460 may be located along the length L of the conductive substrate 400 on the at least one surface 410. A second substrate redox zone 470 may be located along the length L of the conductive substrate 400 on the at least one surface 410. A third substrate redox zone 480 may be located along the length L of the conductive substrate 400 on the at least one surface 410. The first substrate redox zone 460, the second substrate redox zone 470, and the third redox zone 480 may be adjacent, e.g., near, close, contiguous, or adjoining, to each other along the length L of the conductive substrate 400. The indicator electrode 430 may be in electrical contact with the first terminal 110 of the battery 10 via a lead 170. One end of the lead 170 may be in electrical contact with the conductive substrate 400 of the indicator electrode 130 and the other end of the lead 170 may be in electrical contact with the first terminal 110 of the battery 10. The counter electrode 440 includes an area of the second terminal 120 of the battery 10 that is covered by the separator that is combined with an electrolyte 450. The battery condition indicator 100 and the battery 10 are combined so that the consumer need not interact with the battery condition indicator 100 to initiate a display of the current state of charge of the battery 10.

The first substrate redox zone 460 may include at least one redox material 160. The second substrate redox zone 470 may include at least one redox material 162. The third substrate redox zone 480 may include at least one redox material 164. The redox material 160, 162, 164 may be the same, or different, material and each may be coated, or plated, onto the first substrate redox zone 460, the second substrate redox zone 470, and the third substrate redox zone 480 of the indicator electrode.

Figure 6:
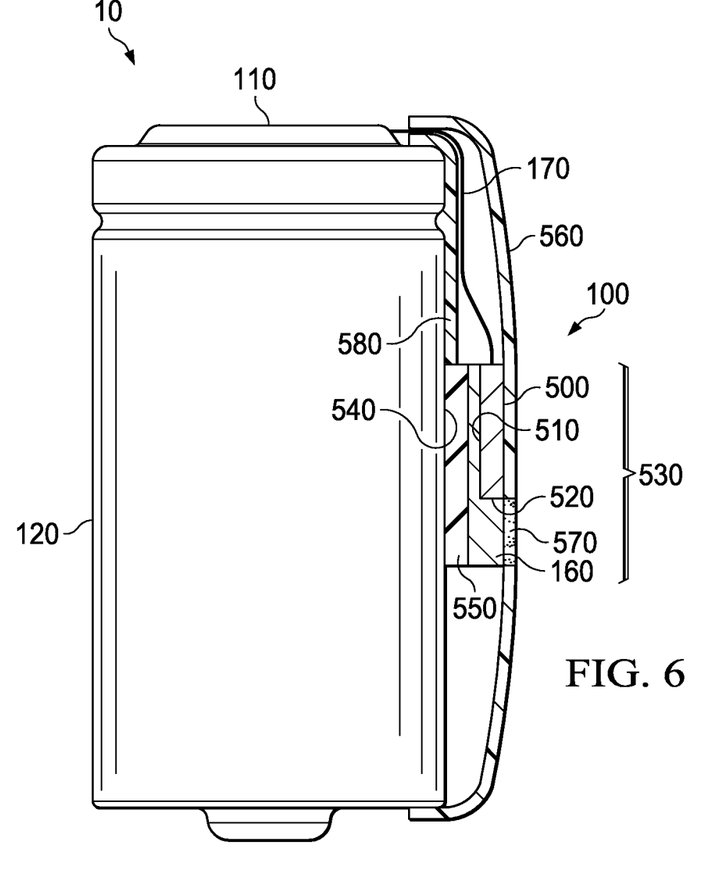
FIG. 6 is another perspective view of a combination of a battery and a battery condition indicator of the present invention where the battery condition indicator is included within a label affixed to the battery.

Referring to FIG. 6, a combination of a battery condition indicator 100 and a battery 10 is shown where the battery condition indicator 100 is included with a label 560 and is affixed to the battery 10. The battery 10 includes a first terminal 110 and a second terminal 120. The battery condition indicator 100 includes an indicator electrode 530; a counter electrode 540 for the indicator electrode 530; and a separator that is combined with an electrolyte 550. The indicator electrode 530 of the battery condition indicator 100 includes a conductive substrate 500. The conductive substrate 500 may have at least one surface 510 and at least a second surface 520. The conductive substrate 500 may include at least one redox material 160 on the at least one surface 510. The indicator electrode 530 may be in electrical contact with the first terminal 110 of the battery 10 via a lead 170. One end of the lead 170 may be in electrical contact with the conductive substrate 500 of the indicator electrode 130 and the other end of the lead 170 may be in electrical contact with the first terminal 110 of the battery 10. The counter electrode 540 includes an area of the second terminal 120 of the battery 10 that is covered by the separator that is combined with an electrolyte 550. The label 560 may be a laminated multi-layer film with a transparent or translucent layer bearing the label graphics and text. The label 560 may include a viewing window 570 through which the consumer may view the indicator electrode 530 and determine the current state of the battery 10 based upon the visual activity of the indicator electrode 530. The label 560 may be made from polyvinyl chloride (PVC), polyethylene terephthalate (PET), and other similar polymer materials. An insulator 580 may be placed between the second terminal 120 and the lead 170 to prevent electrical shorting between the first terminal 110 and the second terminal 120. The battery condition indicator 100 included with the label 560 and the battery 10 are combined so that the consumer need not interact with the battery condition indicator 100 to initiate a display of the current state of charge of the battery 10.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, if any, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention. For example, the electrochemical systems available for use within a battery are diverse and battery construction may vary from the exemplary alkaline battery construction discussed above. The battery condition indicator of the present invention may be applied to any battery construction utilizing any electrochemical system. The battery condition indicator may, for example, be applied to an high valence nickel battery where the anode active material includes zinc, the cathode active material includes a high valence nickel, and the electrolyte is alkaline and aqueous. The battery condition indicator may, for example, be applied to a nickel oxyhydroxide battery where the anode active material includes zinc, the cathode active material includes nickel oxyhydroxide, and the electrolyte is alkaline and aqueous. The battery condition indicator may, for example, be applied to a lithium metal primary battery, such as a lithium iron disulfide battery where the anode active material includes lithium, the cathode active material includes iron disulfide, and the electrolyte is nonaqueous. The battery condition indicator may, for example, be applied to a nickel metal hydride battery where the anode active material includes metal alloy capable of absorbing hydrogen, the cathode active material includes nickel oxyhydroxide, and the electrolyte is aqueous potassium hydroxide. The battery condition indicator may, for example, be applied to a lithium metal secondary battery where the anode active material includes carbon, the cathode active material includes a lithium intercalation compound, and the electrolyte is nonaqueous. The battery condition indicator may, for example, be applied to a lithium ion secondary battery where the anode active material includes carbon, the cathode active material includes a lithium intercalation compound, and the electrolyte is nonaqueous.

What is claimed is:

1. A battery condition indicator comprising:
   at least one indicator electrode in electrical connection with a first terminal of a battery, the at least one indicator electrode comprising at least one redox material;
   a counter electrode for the at least one indicator electrode, the counter electrode is a second terminal of the battery; and
   a separator that is combined with an electrolyte, the separator that is combined with an electrolyte is positioned between the at least one indicator electrode and the counter electrode;
   wherein the at least one indicator electrode comprises a conductive substrate, the conductive substrate comprising a length, a first substrate redox zone, and at least a second substrate redox zone; the first substrate redox zone is adjacent to the at least one second substrate redox zone along the length of the conductive substrate; the first substrate redox zone comprises at least one redox material; the at least one second substrate redox zone comprises at least one redox material; the materials of the first and second substrate redox zones being different from one another; the counter electrode has an electrochemical capacity; the at least one indicator electrode has an electrochemical capacity; and the electrochemical capacity of the counter electrode is at least 3 times greater than the electrochemical capacity of the indicator electrode.

2. The battery condition indicator of claim 1, wherein the first terminal of the battery is a negative terminal and the second terminal of the battery is a positive terminal.

3. The battery condition indicator of claim 1, wherein the first terminal of the battery is a positive terminal and the second terminal of the battery is a negative terminal.

4. The battery condition indicator of claim 1, wherein the at least one indicator electrode comprises a conductive substrate, the conductive substrate comprising metal foil, metal film, metal grid, metal mesh, carbon foil, carbon film, carbon grid, carbon mesh, copper foil, copper film, copper grid, copper mesh, graphitic network, graphite film, graphite foil, graphite grid, or graphite mesh.

5. The battery condition indicator of claim 1, wherein the at least one indicator electrode comprises a nonconductive substrate comprising polymer film, polymer grid, or polymer mesh; a conductive material coated onto at least one surface of the nonconductive substrate, the conductive material comprising graphite, graphene, copper, zinc; tin, and indium; and the at least one redox material coated onto at least one surface of the conductive material.

6. The battery condition indicator of claim 1, wherein the at least one redox material comprises zinc, tin, indium, chromium, antimony, bismuth, copper, brass, bronze, copper oxide, copper hydroxide, chromium oxide, nickel oxide, nickel oxyhydroxide, any alloy thereof, or any combination thereof.

7. The battery condition indicator of claim 1, wherein the counter electrode comprises metal oxide, metal hydroxide, metal oxyhydroxide, nickel, nickel oxide, nickel hydroxide, nickel oxyhydroxide, vanadium oxide, manganese, manganese oxide, manganese hydroxide, manganese oxyhydroxide, manganese dioxide, copper, copper oxide, copper hydroxide, iron, iron oxide, iron hydroxide, iron oxyhydroxide, cobalt, cobalt oxide, cobalt hydroxide, cobalt oxyhydroxide, chromium, chromium oxide, chromium hydroxide, carbon black, graphene, graphite, oxygen, or any combination thereof.

8. The battery condition indicator of claim 1, wherein the at least one indicator electrode is in permanent electrical connection with the first terminal of the battery.

9. The battery condition indicator of claim 8, wherein the permanent electrical connection comprises an electrical lead, the electrical lead comprising graphite, graphene, carbon black, copper, nickel, zinc, or any combination thereof.

10. The battery condition indicator of claim 1, wherein the at least one indicator electrode comprises a conductive substrate with the at least one redox material on a surface of the conductive substrate.

11. The battery condition indicator of claim 10, wherein the at least one redox material comprises zinc, tin, indium, chromium, antimony, bismuth, copper, brass, bronze, copper oxide, copper hydroxide, chromium oxide, nickel oxide, nickel oxyhydroxide, any alloy thereof, or any combination thereof.

12. The battery condition indicator of claim 10, wherein the conductive substrate comprises copper and the at least one redox material on the surface of the conductive substrate comprises zinc.

13. The battery condition indicator of claim 1, wherein the at least one redox material comprises zinc, tin, indium, chromium, antimony, bismuth, copper, brass, bronze, copper oxide, copper hydroxide, chromium oxide, nickel oxide, nickel oxyhydroxide, any alloy thereof, or any combination thereof.

14. The battery condition indicator of claim 1, wherein the conductive substrate comprises copper; the at least one redox material of the first substrate redox zone comprises zinc; and the at least one redox material of the second substrate redox zone comprises zinc, tin, or indium.

15. The battery condition indicator of claim 1, wherein the battery is selected from the group consisting of: an alkaline battery, a lithium metal primary battery, a nickel metal hydride battery, a nickel oxyhydroxide battery, a high valence nickel battery, a lithium metal secondary battery, and a lithium ion secondary battery.

16. The battery condition indicator of claim 1, wherein the electrochemical capacity of the counter electrode is from about 3 to about 1000 times greater times greater than the electrochemical capacity of the indicator electrode.

17. The battery condition indicator of claim 1, wherein the electrochemical capacity of the counter electrode is from about 150 $mC/cm^2$ to about 1,000,000 $mC/cm^2$ and the electrochemical capacity of the indicator electrode is from about 50 $mC/cm^2$ to about 1,000 $mC/cm^2$.

18. The battery condition indicator of claim 1, wherein the battery condition indicator has an internal resistance greater than about 0.5 MOhm when the battery voltage is 1.65V; and the battery condition indicator does not require consumer intervention to visually indicate a status of the battery.

* * * * *